US009062138B2

(12) United States Patent
Ker et al.

(10) Patent No.: US 9,062,138 B2
(45) Date of Patent: Jun. 23, 2015

(54) CONTROLLING RESIN PROPERTIES IN A GAS PHASE POLYMERIZATION PROCESS

(71) Applicant: NOVA Chemicals (International) S.A., Fribourg (CH)

(72) Inventors: Victoria Ker, Calgary (CA); Yan Jiang, Calgary (CA); Sergio Alejandro Guillen-Castellanos, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 14/074,785

(22) Filed: Nov. 8, 2013

(65) Prior Publication Data

US 2014/0155561 A1 Jun. 5, 2014

(30) Foreign Application Priority Data

Dec. 3, 2012 (CA) .................................... 2797620

(51) Int. Cl.
| | | |
|---|---|---|
| C08F 4/76 | (2006.01) | |
| C08F 4/64 | (2006.01) | |
| C08F 2/34 | (2006.01) | |
| C08F 210/16 | (2006.01) | |

(52) U.S. Cl.
CPC .................................... C08F 210/16 (2013.01)

(58) Field of Classification Search
CPC ................ C08F 2/34; C08F 4/60; C08F 4/76
USPC ............................ 526/172, 161, 901, 74, 903
See application file for complete search history.

(56) References Cited

U.S. PATENT DOCUMENTS

| 4,543,399 | A | | 9/1985 | Jenkins, II et al. | |
|---|---|---|---|---|---|
| 4,588,790 | A | | 5/1986 | Jenkins, II et al. | |
| 4,933,149 | A | | 6/1990 | Rhee et al. | |
| 5,026,795 | A | | 6/1991 | Hogan | |
| 5,028,670 | A | | 7/1991 | Chinh et al. | |
| 5,283,278 | A | | 2/1994 | Daire et al. | |
| 5,317,036 | A | | 5/1994 | Brady, III et al. | |
| 5,352,749 | A | | 10/1994 | DeChellis et al. | |
| 5,405,922 | A | | 4/1995 | DeChellis et al. | |
| 5,436,304 | A | | 7/1995 | Griffin et al. | |
| 5,453,471 | A | | 9/1995 | Bernier et al. | |
| 5,462,999 | A | | 10/1995 | Griffin et al. | |
| 5,616,661 | A | | 4/1997 | Eisinger et al. | |
| 5,668,228 | A | | 9/1997 | Chinh et al. | |
| 5,965,677 | A | | 10/1999 | Stephan et al. | |
| 6,022,935 | A | | 2/2000 | Fischer et al. | |
| 6,235,672 | B1 | * | 5/2001 | McKay et al. ................ | 502/155 |
| 6,300,436 | B1 | | 10/2001 | Agapiou et al. | |
| 6,306,984 | B1 | | 10/2001 | Agapiou et al. | |
| 6,372,864 | B1 | * | 4/2002 | Brown ............................ | 526/65 |
| 6,391,819 | B1 | | 5/2002 | Agapiou et al. | |
| 6,399,535 | B1 | | 6/2002 | Shih et al. | |
| 6,472,342 | B2 | | 10/2002 | Agapiou et al. | |
| 6,559,090 | B1 | | 5/2003 | Shih et al. | |
| 6,562,924 | B2 | | 5/2003 | Benazouzz et al. | |
| 6,608,153 | B2 | | 8/2003 | Agapiou et al. | |
| 6,627,713 | B2 | | 9/2003 | Bernier et al. | |
| 6,642,313 | B1 | * | 11/2003 | Kazakov et al. .............. | 525/191 |
| 6,686,306 | B2 | | 2/2004 | Shih | |
| 6,734,131 | B2 | | 5/2004 | Shih et al. | |
| 6,936,675 | B2 | | 8/2005 | Szul et al. | |
| 6,958,375 | B2 | | 10/2005 | Shih et al. | |
| 7,179,876 | B2 | | 2/2007 | Szul et al. | |
| 7,321,015 | B2 | * | 1/2008 | Hoang et al. .................... | 526/73 |
| 7,354,880 | B2 | | 4/2008 | Agapiou et al. | |
| 7,476,715 | B2 | | 1/2009 | McKay et al. | |
| 8,431,657 | B2 | * | 4/2013 | Wang et al. ..................... | 526/65 |
| 8,802,584 | B2 | * | 8/2014 | Henderson et al. ........... | 502/129 |
| 2011/0288248 | A1 | * | 11/2011 | Gao et al. ...................... | 526/114 |
| 2012/0252994 | A1 | | 10/2012 | Li et al. | |
| 2012/0316301 | A1 | | 12/2012 | Minh Hoang et al. | |
| 2013/0345377 | A1 | * | 12/2013 | Ker et al. ....................... | 526/147 |

FOREIGN PATENT DOCUMENTS

| CA | 2 716 772 A1 | 4/2011 |
|---|---|---|
| CA | 2 742 461 A1 | 12/2012 |
| EP | 0 107 127 A1 | 5/1984 |
| EP | 0 659 773 A1 | 6/1995 |
| WO | 93/03093 A1 | 2/1993 |

OTHER PUBLICATIONS

Peri, J.B., and Hensley, Jr., A.L.; The Surface Structure of Silica Gel; The Journal of Physical Chemistry; vol. 72, No. 8, Aug. 1968, pp. 2926-2933.
Brunauer, Stephen, Emmett, P.H., and Teller, Edward; Adsorption of Gases in Multimolecular Layers; (Contribution From the Bureau of Chemistry and Soils and George Washington University) vol. 60, Feb. 1938, pp. 309-319.
Clark, James H. and Macquarrie, Duncan J.; Catalysts, Supported; Kirk-Othmer Encyclopedia of Chemical Technology; published online Nov. 15, 2002, copyright 2001 by John Wiley & Sons, Inc., pp. 1-37.
Hamielec, Archie E. and Soares, Joao B.P.; Polymerization Reaction Engineering—Metallocene Catalysts; Prog. Polym. Sci., vol. 21, 1996, Copyright 1996 Elsevier Science Ltd., pp. 651-706.
Pangborn, Amy B., Giardello, Michael A., Grubbs, Robert H., Rosen, Robert K. and Timmers, Francis J.; Safe and Convenient Procedure for Solvent Purification; Copyright 1996 American Chemical Society; Organometallics, 1996, 15, pp. 1518-1520.
ASTM-D1238-10; Standard Test Method for Melt Flow Rates of Thermoplastics by Extrusion Plastometer, copyright ASTM International; pp. 1-15, Feb. 2, 2012.
ASTM-D 1928-96; Standard Practive for Preparation of Compression-Molded Polyethylene Test Sheets and Test Specimens; Copyright by ASTM Int'l, Aug. 30, 2012.
ASTM-D 6476-99; Standard Test Method for Determining Molecular weight Distribution and Molecular Weight Averages of Polyolefins by High Temperature Gel Permeation Chromatography; Copyright by ASTM International; pp. 1-6, Feb. 2, 2012.
ASTM D 6645-01; Standard Test Method for Methyl (Comonomer) Content in Polyethylene by Infrared Spectrophotometry; Copyright ASTM International; pp. 1-4, Apr. 16, 2013.

* cited by examiner

*Primary Examiner* — Rip A Lee
(74) *Attorney, Agent, or Firm* — Julie L. Heinrich

(57) ABSTRACT

Methods for dramatically altering the processability of ethylene copolymers made with a supported phosphinimine polymerization catalyst. The method involves changing the polymerization reactor temperature during the polymerization of ethylene and a least one alpha-olefin when a phosphinimine catalyst which comprises a substituted or unsubstituted indenyl ligand and a phosphinimine type ligand.

19 Claims, No Drawings

CONTROLLING RESIN PROPERTIES IN A GAS PHASE POLYMERIZATION PROCESS

FIELD OF THE INVENTION

The present invention relates to supported phosphinimine catalysts, which, when used in the presence of different polymerization temperatures in a gas phase polymerization process, give rise to ethylene copolymers of different molecular weight distributions, stress exponents, and melt flow ratios.

BACKGROUND OF THE INVENTION

Ethylene copolymer molecular weight distribution and related parameters are an important predictor of polymer processability. Generally, an increase in the molecular weight distribution means an increase in polymer processability. However, changes in polymer molecular weight distribution may also affect polymer properties such as the optical properties and toughness. Thus, while processability is an important parameter in, for example, film extrusion applications, as the molecular weight distribution, stress exponent, and melt flow ratio of a polyethylene increase, they can have a negative impact on blown film properties. For example, polymer optical properties, tear strengths as well as dart impact properties can be negatively impacted. Also, the processability and physical property requirements of a polyethylene may be different for different polymer uses and applications.

In the gas phase polymerization of ethylene (optionally with comonomers), a fluidized bed reactor system is often employed. Generally these reactor systems include a reactor having two reaction zones, and a recycle loop which comprises a compressor and a heat exchanger. A two phase system is maintained in the reaction zone where growing particles of polyethylene resin are a solid suspended (i.e. fluidized) within a gaseous flow entering the reactor through a distributor plate. Catalyst is injected via an injection line, and the heat exchanger removes the heat of the polymerization reaction.

Generally speaking, a goal when making polyethylene products in a fluidized bed using a given catalyst system is to have a reactor system that results in products with uniform properties which are consistently and reliably made even where polymerization conditions (such as comonomer feed, reaction temperature, condensable hydrocarbon concentration etc.) may be subject to minor process fluctuations. Indeed, robust catalyst systems are able to make a specific product reliably and without too much sensitivity to changes in process conditions. However, there is a drawback to such catalyst systems: namely, the polyethylene products are beholden to the choice of the specific catalyst chosen. To make polyethylene with, for example, a different molecular weight distribution, either very different process conditions can be employed, or a new catalyst system can be explored. When exploring highly variant process conditions, other desirable product attributes may be lost, or the catalyst may not perform at a commercially acceptable level. Alternatively, use of a new catalyst may require reactor shut down.

In view of the forgoing, a need exists for new catalysts systems which when subjected to minor process changes, can make differentiated product with useful properties. The catalyst system recently disclosed in U.S. Pat. Appl. No. 20120252994A1 discloses a system that comprised a bridged metallocene catalyst supported on silica. A specific catalyst, silica supported $(CH_2)_4Si[(CH_3)_4C_5H][C_5H_5]ZrCl_2$, was shown to make polyethylene products having different melt flow ratios (MFRs) when the polymerization reactor temperature was changed. In addition, U.S. Pat. Nos. 6,936,675 and 7,179,876 teach that the molecular weight distribution ($M_w/M_n$) of an ethylene copolymer can be increased by decreasing the polymerization reaction temperature, when using bis-cyclopentadienyl hafnocene catalysts, such as bis(n-propylcyclopentadienyl)hafnium dichloride or bis(n-propylcyclopentadienyl)hafnium difluoride.

We now report a catalyst system which under different polymerization temperatures produces polyethylene with different molecular weight distributions, stress exponents and melt flow ratios in a gas phase reactor. Use of the catalyst system of the present invention, allows one to, for example, tailor the balance between polyethylene processability on the one hand and polymer physical and optical properties on the other hand. Such a method allows one to, for example, tailor the properties of an ethylene copolymer toward a specific end use application.

SUMMARY OF THE INVENTION

Disclosed herein is the use of a phosphinimine catalyst comprising an indenyl ligand at different polymerization temperatures in a gas phase polymerization process allows one to alter and control the molecular weight distribution, stress exponent and melt flow ratio of an ethylene copolymer made using such a catalyst.

Further, the use of the phosphinimine catalyst comprising an indenyl ligand allows for the production of ethylene copolymers having variant molecular weight distributions, stress exponents and melt flow ratios, without necessitating reactor shut down.

Provided is a method for altering the stress exponent of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the stress exponent of the ethylene copolymer is altered by changing the temperature in the reactor; and wherein the phosphinimine catalyst has the formula: $LTi(N=P(t-Bu)_3)X_2$; where L is a substituted or unsubstituted indenyl ligand and X is an activatable ligand.

Provided is a method for altering the molecular weight distribution ($M_w/M_n$) of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the molecular weight distribution ($M_w/M_n$) of the ethylene copolymer is altered by changing the temperature in the reactor; and wherein the phosphinimine catalyst has the formula: $LTi(N=P(t-Bu)_3)X_2$; where L is a substituted or unsubstituted indenyl ligand and X is an activatable ligand.

Provided is a method for altering the melt flow ratio ($I_{21}/I_2$) of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the melt flow ratio ($I_{21}/I_2$) of the ethylene copolymer is altered by changing the temperature in the reactor; and wherein the phosphinimine catalyst has the formula: $LTi(N=P(t-Bu)_3)X_2$; where L is a substituted or unsubstituted indenyl ligand and X is an activatable ligand.

Provided is a method for altering the stress exponent of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the stress exponent of the ethylene copolymer is decreased by increasing the temperature in the reactor; and wherein the phosphinimine catalyst has the formula: LTi(N=P(t-Bu)$_3$)X$_2$; where L is a substituted or unsubstituted indenyl ligand and X is an activatable ligand.

Provided is a method for altering the molecular weight distribution (M$_w$/M$_n$) of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the molecular weight distribution (M$_w$/M$_n$) of the ethylene copolymer is decreased by increasing the temperature in the reactor; and wherein the phosphinimine catalyst has the formula: LTi(N=P(t-Bu)$_3$)X$_2$; where L is a substituted or unsubstituted indenyl ligand and X is an activatable ligand.

Provided is a method for altering the melt flow ratio (I$_{21}$/I$_2$) of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the melt flow ratio (I$_{21}$/I$_2$) of the ethylene copolymer is decreased by increasing the temperature in the reactor; and wherein the phosphinimine catalyst has the formula: LTi(N=P(t-Bu)$_3$)X$_2$; where L is a substituted or unsubstituted indenyl ligand and X is an activatable ligand.

Provided is a method for altering the stress exponent of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the stress exponent of the ethylene copolymer is increased by decreasing the temperature in the reactor; and wherein the phosphinimine catalyst has the formula: LTi(N=P(t-Bu)$_3$)X$_2$; where L is a substituted or unsubstituted indenyl ligand and X is an activatable ligand.

Provided is a method for altering the molecular weight distribution (M$_w$/M$_n$) of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the molecular weight distribution (M$_w$/M$_n$) of the ethylene copolymer is increased by decreasing the temperature in the reactor; and wherein the phosphinimine catalyst has the formula: LTi(N=P(t-Bu)$_3$)X$_2$; where L is a substituted or unsubstituted indenyl ligand and X is an activatable ligand.

Provided is a method for altering the melt flow ratio (I$_{21}$/I$_2$) of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the melt flow ratio (I$_{21}$/I$_2$) of the ethylene copolymer is increased by decreasing the temperature in the reactor; and wherein the phosphinimine catalyst has the formula: LTi(N=P(t-Bu)$_3$)X$_2$; where L is a substituted or unsubstituted indenyl ligand and X is an activatable ligand.

Provided is a method for altering the stress exponent of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the stress exponent of the ethylene copolymer is decreased by increasing the temperature in the reactor by at least about 1° C.; and wherein the phosphinimine catalyst has the formula: LTi(N=P(t-Bu)$_3$)X$_2$; where L is a substituted or unsubstituted indenyl type ligand and X is an activatable ligand.

Provided is a method for altering the stress exponent of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the stress exponent of the ethylene copolymer is increased by decreasing the temperature in the reactor by at least about 1° C.; and wherein the phosphinimine catalyst has the formula: LTi(N=P(t-Bu)$_3$)X$_2$; where L is a substituted or unsubstituted indenyl type ligand and X is an activatable ligand.

Provided is a method for altering the stress exponent of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the stress exponent of the ethylene copolymer is decreased by increasing the temperature in the reactor by at least about 5° C.; and wherein the phosphinimine catalyst has the formula: LTi(N=P(t-Bu)$_3$)X$_2$; where L is a substituted or unsubstituted indenyl type ligand and X is an activatable ligand.

In an embodiment of the invention, the temperature of a gas phase reactor is increased by an amount which is sufficient to reduce the stress exponent of an ethylene copolymer by at least about 3%.

In an embodiment of the invention, the temperature of a gas phase reactor is decreased by an amount which is sufficient to increase the stress exponent of an ethylene copolymer by at least about 3%.

In an embodiment of the invention, the temperature of a gas phase reactor is increased by an amount which is sufficient to reduce the molecular weight distribution of an ethylene copolymer (M$_w$/M$_n$) by at least about 5%.

In an embodiment of the invention, the temperature of a gas phase reactor is decreased by an amount which is sufficient to increase the molecular weight distribution (M$_w$/M$_n$) of an ethylene copolymer by at least about 5%.

In an embodiment of the invention, the temperature of a gas phase reactor is increased by an amount which is sufficient to reduce the melt flow ratio (I$_{21}$/I$_2$) of an ethylene copolymer by at least about 10%.

In an embodiment of the invention, the temperature of a gas phase reactor is decreased by an amount which is sufficient to increase the melt flow ratio (I$_{21}$/I$_2$) of an ethylene copolymer by at least about 10%.

Provided in one embodiment is a method for altering the stress exponent of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the stress exponent of the ethylene copolymer is altered by changing the temperature in the reactor by at least 1° C.; and wherein the phosphinimine catalyst has the formula: LM(N=PR$_3$)X$_2$; wherein M is selected from Ti, Hf and Zr;
L is a substituted or unsubstituted indenyl ligand;
X is an activatable ligand; and
wherein each R is independently selected from a hydrogen atom; a halogen atom; C$_{1-20}$ hydrocarbyl radicals which are unsubstituted or further substituted by one or more halogen atom and/or C$_{1-20}$ alkyl radical; C$_{1-8}$ alkoxy radical; C$_{6-10}$ aryl; C$_{6-10}$ aryloxy radical (the aryl or aryloxy radical optionally being unsubstituted or further substituted by one or more halogen atom and/or C$_{1-20}$ alkyl radical); amido radical; silyl radical of the formula: —SiR'$_3$ wherein each R' is independently selected from hydrogen, a $C_{1-8}$ alkyl or $C_{1-8}$ alkoxy radical, $C_{6-10}$ aryl and $C_{6-10}$ aryloxy radicals; and germanyl radical of the formula: —GeR'$_3$ wherein R' is as defined above.

In one embodiment M is Ti.

In one embodiment M is Hf.

In one embodiment M is Zr.

In one embodiment L is not bridged to, or does not make a bridge with another, ligand within the metal coordination sphere of the phosphinimine catalyst.

In one embodiment L is unsubstituted indenyl.

In one embodiment L is indenyl singly or multiply substituted by a group or groups selected from substituted or unsubstituted alkyl group; substituted or unsubstituted aryl group; and substituted or unsubstituted benzyl; wherein substituents for the alkyl, aryl or benzyl group are selected from alkyl groups, aryl groups, alkoxy groups, aryloxy groups, alkylaryl groups, arylalkyl groups and halide groups.

In one embodiment L is indenyl singly or multiply substituted by a group or groups selected from halide substituted alkyl group, a halide substituted benzyl group, or a halide substituted aryl group.

In one embodiment L is indenyl singly or multiply substituted by a group or groups selected from partially halide substituted benzyl groups.

In one embodiment L is indenyl singly or multiply substituted by a fully halide substituted benzyl group.

In one embodiment L is a multiply substituted indenyl ligand.

In one embodiment L is a singly substituted indenyl ligand.

In one embodiment L is 1-($C_6F_5CH_2$)—Indenyl.

In one embodiment the phosphinimine catalyst is (1-$C_6F_5CH_2$—Ind)Ti(N=P(t-Bu)$_3$)Cl$_2$ In one embodiment X is selected from a hydrogen atom; a halogen atom; an amido; or a phosphido radical; a $C_{1-10}$ hydrocarbyl radical; a $C_{1-10}$ alkoxy radical; a $C_{6-10}$ aryl; $C_{6-10}$ aryloxy radical wherein each of the hydrocarbyl, alkoxy, aryl, or aryloxy radicals may be un-substituted or further substituted by one or more groups selected from halogen; a $C_{1-8}$alkyl; a $C_{1-8}$alkoxy; a $C_{6-10}$ aryl; and $C_{6-10}$ aryloxy; with the proviso that X is not a cyclopentadienyl.

In one embodiment two or more X groups are joined to one another and form a substituted or unsubstituted diene ligand or a delocalized group containing a heteroatom.

In one embodiment two or more X groups are joined to and are an acetate or acetamidinate group.

In one embodiment X is selected from a halide atom, a $C_{1-4}$ alkyl radical and a benzyl radical.

In one embodiment X is a halide or a hydrocarbyl radical.

In one embodiment X is selected from halide, methyl and benzyl.

In one embodiment each R is selected from $C_{1-20}$ hydrocarbyl radicals which are unsubstituted or further substituted by one or more halogen atom and/or $C_{1-20}$ alkyl radical.

In one embodiment each R is selected from unsubstituted $C_{1-20}$ hydrocarbyl radicals.

In one embodiment R is t-butyl.

In an embodiment of the invention, the cocatalyst is an alkylaluminoxane compound.

In one embodiment, the cocatalyst is selected from alkylaluminoxane and ionic activators, optionally together with an alkylating agent.

In one embodiment, the cocatalyst is an alkylaluminoxane compound of the formula: $R^3{}_2Al^1O(R^3Al^1O)_mAl^1R^3{}_2$, wherein each $R^3$ is a $C_{1-20}$ hydrocarbyl radical and m is from 3 to 50. In one embodiment, $R^3$ is methyl radical and m is from 10 to 40.

In one embodiment, the cocatalyst is methylaluminoxane (MAO).

In one embodiment, the cocatalyst is modified methylaluminoxane (MMAO).

In one embodiment, the inert support is a porous or non-porous support material.

In one embodiment, the inert support is selected from talc, inorganic oxides, inorganic chlorides, aluminophosphates and polymer supports.

In an embodiment of the invention, the inert support is silica.

In one embodiment, the alpha-olefin is 1-butene, 1-hexene, or 1-octene.

In an embodiment of the invention, the alpha-olefin is 1-hexene.

In an embodiment of the invention, the phosphinimine catalyst is (L)Ti(N=P(t-Bu)$_3$)Cl$_2$, where L is a substituted or unsubstituted indenyl ligand.

In an embodiment of the invention, the gas phase reactor is a fluidized bed reactor.

In an embodiment of the invention, the temperature of a gas phase reactor is changed by at least about 1° C.

In an embodiment of the invention, the temperature of a gas phase reactor is changed by at least about 5° C.

In an embodiment of the invention, the temperature of a gas phase reactor is changed by at least about 10° C.

In one embodiment, the polymerization catalyst additionally comprises a catalyst modifier.

In one embodiment, the catalyst modifier is selected from carboxylate metal salts, polyoxyethylenealkylamines, aluminum stearate and aluminum oleate.

In an embodiment of the invention, the polymerization catalyst additionally comprises a catalyst modifier comprising at least one compound represented by the formula: R*N(($CH_2$)$_n$OH)(($CH_2$)$_m$OH) where R* is a hydrocarbyl group having from 5 to 30 carbon atoms, and n and m are integers from 1 to 20.

In one embodiment, the catalyst modifier is selected from Kemamine AS-990™, Kemamine AS-650™, Armostat-1800™, bis-hydroxy-cocoamine, 2,2'-octadecyl-amino-bisethanol, Atmer-163™, OCTASTAT™ and STADIS™.

In one embodiment the invention is a polymer resin comprising an ethylene copolymer made using the methods herein above.

In one embodiment the invention is a polymer blend comprising an ethylene copolymer made using the methods herein above.

In one embodiment the invention is a film comprising an ethylene copolymer made using the methods herein above.

DETAILED DESCRIPTION OF PREFERRED EMBODIMENTS

For convenience, before further description of the present invention, certain terms employed in the specification, examples and appended claims are collected here. These definitions and explanations should be read in light of the remainder of the disclosure and understood as by a person of skill in the art. Unless defined otherwise, all technical and scientific terms used herein have the same meaning as commonly understood by a person of ordinary skill in the art.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

Unless otherwise indicated, the disclosure is not limited to specific reactants, substituents, catalysts, reaction conditions, or the like, as such may vary, it is also to be understood that the terminology used herein is for the purpose of describing particular embodiments only and is not intended to be limiting.

As used in the specification and the appended claims, the terms "for example," "for instance." "such as," or "including" are meant to introduce examples that farther clarify more general subject matter. Unless otherwise specified, these examples are provided only as an aid for understanding the applications illustrated in the present disclosure, and are not meant to be limiting in any fashion.

As used in the specification and the appended claims, the terms "group," "radical," "substituent," or "ligand" may be used interchangeably and are meant to describe a chemical group or entity bonded to or pending from another chemical group. In some instances the chemical group may be referred to without one of the above modifiers and will instead be referred to has the atom name, or use standard nomenclature that indicates it is a pendant group. For example, halide, halogen, halo, halogen atom maybe used interchangeably and refer to the same chemical group.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements identified by the "and/or" clause, whether related or unrelated to those elements identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

In some embodiments of the present invention, the use of different temperatures in a gas phase polymerization process employing a phosphinimine based polymerization catalyst gives rise to ethylene copolymer products having different molecular weight distributions, stress exponents and melt flow ratios (MFRs).

In some embodiments of the present invention, to improve processability the molecular weight distribution, stress exponent or MFR is increased.

In some embodiments of the present invention, to improve physical properties, such as dart impact strength and optical properties then the molecular weight, stress exponent or MFR is decreased.

The Polymerization Catalyst

In the present invention, the polymerization catalyst comprises a phosphinimine catalyst having an indenyl ligand (which may be unsubstituted or substituted), an inert support and a cocatalyst. In an embodiment of the invention, the polymerization catalyst further comprises a catalyst modifier.

The Phosphinimine Catalyst

In one embodiment, the phosphinimine catalyst is based on transition metals from group 4, for example, titanium, hafnium or zirconium. In an embodiment, the phosphinimine catalysts are group 4 metal complexes in their highest oxidation state.

The phosphinimine catalysts described herein, may be activated by one or more cocatalytic or activator species in order to provide polymer from olefins.

A phosphinimine catalyst is a compound (for example an organometallic compound) based on a group 3, 4 or 5 metal and which is characterized as having at least one phosphinimine ligand. Any compounds/complexes having a phosphinimine ligand and that display catalytic activity for ethylene (co)polymerization may be called "phosphinimine catalysts."

In an embodiment of the invention, a phosphinimine catalyst is defined by the formula: $(L)_n(PI)_mMX_p$ where M is a transition metal selected from Ti, Hf, and Zr; PI is a phosphinimine ligand; L is an indenyl ligand; X is an activatable ligand; m is 1 or 2; n is 0 or 1; and p is determined by the valency of the metal M. In one embodiment, m is 1, n is 1 and p is 2.

In an embodiment of the invention, the phopshinimine catalyst will have a phosphinimine ligand which is not bridged to, or does not make a bridge with, another ligand within the metal coordination sphere of the phosphinimine catalyst, such as for example, an indenyl ligand.

In an embodiment of the invention, the phopshinimine catalyst will have an indenyl ligand which is not bridged to, or does not make a bridge with another, ligand within the metal coordination sphere of the phosphinimine catalyst, such as for example, a phosphinimine ligand.

In an embodiment of the invention, a phosphinimine catalyst is defined by the formula: $(L)(PI)MX_2$ where M is a transition metal selected from Ti, Hf, and Zr; PI is a phosphinimine ligand; L is an indenyl ligand; and X is an activatable ligand.

The phosphinimine ligand is defined by the formula: $R_3P=N-$, where N bonds to the metal (N is nitrogen, P is phosphorus), and wherein each R is independently selected from a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl; $C_{6-10}$ aryloxy radical (the aryl or aryloxy radical optionally being unsubstituted or further substituted by one or more halogen atom and/or $C_{1-20}$ alkyl radical); amido radical; silyl radical of the formula: —SiR'$_3$ wherein each R' is independently selected from hydrogen, a $C_{1-8}$ alkyl, $C_{1-8}$ alkoxy radical, $C_{6-10}$ aryl; $C_{6-10}$ aryloxy radicals; and germanyl radical of the formula: —GeR'$_3$ wherein R' is as defined above.

In one embodiment of the invention, the phosphinimine ligand is chosen so that each R is a hydrocarbyl radical. In an embodiment of the invention, the phosphinimine ligand is tri-(tertiarybutyl)phosphinimine (i.e. where each R is a tertiary butyl (i.e. a t-Bu) group).

In an embodiment of the invention, the phosphinimine catalyst is a group 4 compound/complex which contains one phosphinimine ligand (as described above) and one ligand L which is an indenyl ligand.

As used herein, the term indenyl ligand (or "Ind" for short) is a fully aromatic ligand containing a nine carbon bicyclic ring system comprising at least one 5 membered ring which is bonded to the metal via eta-5 or via eta-3 bonding. The term "indenyl" or "indenyl ligand" includes, unsubstituted indenyl ligands and singly or multiply substituted indenyl ligands. The substituents for the indenyl ligand can be selected from: a $C_{1-30}$ hydrocarbyl radical (which hydrocarbyl radical may be unsubstituted or further substituted by, for example, a halide and/or a hydrocarbyl group; for example a suitable substituted $C_{1-30}$ hydrocarbyl radical is a pentafluorobenzyl group such as —$CH_2C_6F_5$); a halogen atom; a $C_{1-8}$ alkoxy radical; a $C_{6-10}$ aryl; $C_{6-10}$ aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula —Si(R')$_3$ wherein each R' is independently selected from hydrogen, a $C_{1-8}$ alkyl; $C_{1-8}$ alkoxy radical, $C_{6-10}$ aryl and $C_{6-10}$ aryloxy radicals; and a germanyl radical of the formula —Ge(R')$_3$ wherein R' is as defined directly above.

The use of phosphinimine catalysts comprising a fluorenyl ligand which is unsubstituted or singly substituted or multiply substituted is also contemplated for use in the current invention, where any substituents on the fluorenyl ligand are the same as those defined above for an indenyl ligand.

The term "perfluorinated aryl group" means that each hydrogen atom attached to a carbon atom in an aryl group has been replaced with a fluorine atom as is well understood in the art (e.g. a perfluorinated phenyl group or substituent has the formula —$C_6F_5$). Perfluorinated aryl group is the same as a fully fluorinated phenyl group.

In an embodiment of the invention, the phosphinimine catalyst will have a single or multiply substituted indenyl ligand and a phosphinimine ligand which is substituted by three tertiary butyl substituents.

An indenyl ligand has a framework of carbon atoms with the numbering scheme provided below, so the location of a substituent can be readily identified.

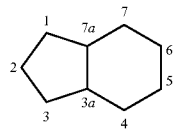

In an embodiment of the invention, the phosphinimine catalyst has a singly substituted indenyl ligand and a phosphinimine ligand which is substituted by three tertiary butyl substituents.

In an embodiment of the invention, the phosphinimine catalyst has a singly or multiply substituted indenyl ligand where the substituent is selected from a substituted or unsubstituted alkyl group, a substituted or an unsubstituted aryl group, and a substituted or unsubstituted benzyl (e.g. $C_6H_5CH_2$—) group. Suitable substituents for the alkyl, aryl or benzyl group may be selected from alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, $R^2$—Indenyl, where the $R^2$ substituent is a substituted or unsubstituted alkyl group, a substituted or an unsubstituted aryl group, or a substituted or unsubstituted benzyl group. Suitable substituents for an $R^2$ alkyl, aryl or benzyl group may be selected from alkyl groups, aryl groups, alkoxy groups, aryloxy groups, alkylaryl groups (e.g. a benzyl group), arylalkyl groups and halide groups.

In an embodiment of the invention, the phosphinimine catalyst has a an indenyl ligand having at least a 1-position substitute (1-$R^2$) where the substituent $R^2$ is a substituted or unsubstituted alkyl group, a substituted or an unsubstituted aryl group, or a substituted or unsubstituted benzyl group. Suitable substituents for an $R^2$ alkyl, aryl or benzyl group may be selected from alkyl groups, aryl groups, alkoxy groups, aryloxy groups, alkylaryl groups (e.g. a benzyl group), arylalkyl groups and halide groups.

In an embodiment of the invention, the phosphinimine catalyst has a singly substituted indenyl ligand, 1-$R^2$-Indenyl where the substituent $R^2$ is in the 1-position of the indenyl ligand and is a substituted or unsubstituted alkyl group, a substituted or unsubstituted aryl group, or a substituted or an unsubstituted benzyl group. Suitable substituents for an $R^2$ alkyl, aryl or benzyl group may be selected from alkyl groups, aryl groups, alkoxy groups, aryloxy groups, alkylaryl groups (e.g. a benzyl group), arylalkyl groups and halide groups.

In an embodiment of the invention, the phosphinimine catalyst will have a singly substituted indenyl ligand, 1-$R^2$-Indenyl, where the substituent $R^2$ is a (fully/partially) halide substituted alkyl group, a (fully/partially) halide substituted benzyl group, or a (fully/partially) halide substituted aryl group.

In an embodiment of the invention, the phosphinimine catalyst will have a singly substituted indenyl ligand, 1-$R^2$-Indenyl, where the substituent $R^2$ is a (fully/partially) halide substituted benzyl group.

In an embodiment of the invention, the phosphinimine catalyst will have a singly substituted indenyl ligand, 1-$R^2$-Indenyl, where the substituent $R^2$ is a (fully/partially) fluoride substituted benzyl group.

When present on an indenyl ligand, a benzyl group can be unsubstituted, or partially or fully substituted by halide atoms, for example fluoride atoms. The aryl group of the benzyl group may be a perfluorinated aryl group, a 2,6 (i.e. ortho) fluoro substituted phenyl group, 2,4,6 (i.e. ortho/para) fluoro substituted phenyl group or a 2,3,5,6 (i.e. ortho/meta) fluoro substituted phenyl group respectively. The benzyl group is, in an embodiment of the invention, located at the 1 position of the indenyl ligand.

In an embodiment of the invention, the phosphinimine catalyst will have a singly substituted indenyl ligand, 1-$R^2$-Indenyl, where the substituent $R^2$ is a pentafluorobenzyl ($C_6F_5CH_2$—) group.

In an embodiment of the invention, the phosphinimine catalyst has the formula: $(1\text{-}R^2\text{-}(\text{Ind}))M(N=P(t\text{-}Bu)_3)X_2$ where $R^2$ is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; M is Ti, Zr or Hf; and X is an activatable ligand.

In an embodiment of the invention, the phosphinimine catalyst has the formula: $(1\text{-}R^2\text{-}(\text{Ind}))M(N=P(t\text{-}Bu)_3)X_2$ where $R^2$ is an alkyl group, an aryl group or a benzyl group and wherein each of the alkyl group, the aryl group, and the benzyl group may be unsubstituted or substituted by at least one fluoride atom; M is Ti, Zr or Hf; and X is an activatable ligand.

In an embodiment of the invention, the phosphinimine catalyst has the formula: $(1\text{-}R^2\text{-}(\text{Ind}))M(N=P(t\text{-}Bu)_3)X_2$ where $R^2$ is an alkyl group, an aryl group or a benzyl group and wherein each of the alkyl group, the aryl group, and the benzyl group may be unsubstituted or substituted by at least one halide atom; M is Ti, Zr or Hf; and X is an activatable ligand.

In an embodiment of the invention, the phosphinimine catalyst has the formula: $(1\text{-}R^2\text{-}(\text{Ind}))\text{Ti}(N=P(t\text{-}Bu)_3)X_2$ where $R^2$ is an alkyl group, an aryl group or a benzyl group and wherein each of the alkyl group, the aryl group, and the benzyl group may be unsubstituted or substituted by at least one fluoride atom; and X is an activatable ligand.

In an embodiment of the invention, the phosphinimine catalyst has the formula: $(1\text{-}C_6F_5CH_2\text{—Ind})M(N=P(t\text{-}Bu)_3)X_2$, where M is Ti, Zr or Hf; and X is an activatable ligand.

In an embodiment of the invention, the phosphinimine catalyst has the formula: $(1\text{-}C_6F_5CH_2\text{—Ind})\text{Ti}(N=P(t\text{-}Bu)_3)X_2$, where X is an activatable ligand.

In the current invention, the term "activatable", means that the ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present invention, the activatable ligand, X is independently selected from a hydrogen atom; a halogen atom, an amido; and a phosphido radical; a $C_{1\text{-}10}$ hydrocarbyl radical; a $C_{1\text{-}10}$ alkoxy radical; a $C_{6\text{-}10}$ aryl; $C_{6\text{-}10}$ aryloxy radical, (where each of the hydrocarbyl, alkoxy, aryl, and aryl oxide radicals may be un-substituted or further substituted by one or more halogen or other group selected from a $C_{1\text{-}8}$ alkyl; a $C_{1\text{-}8}$ alkoxy, a $C_{6\text{-}10}$ aryl; and $C_{6\text{-}10}$ aryloxy); but where X is not a cyclopentadienyl. Two X ligands may also be joined to one another and form for example, a substituted or unsubstituted diene ligand (i.e. 1,3-diene); or a delocalized heteroatom containing group such as an acetate or acetamidinate group. In an embodiment of the invention, each X is independently selected from a halide atom, a $C_{1\text{-}4}$ alkyl radical and a benzyl radical.

The number of activatable ligands depends upon the valency of the metal and the valency of the activatable ligand. In an embodiment, the phosphinimine catalysts are based on group 4 metals in their highest oxidation state (i.e. $4^+$). One another embodiment activatable ligands are monoanionic such as a halide (e.g. chloride) or a hydrocarbyl (e.g. methyl, benzyl).

In another embodiment, the metal of the phosphinimine catalyst may not be in the highest oxidation state. For example, a titanium (III) component would contain only one activatable ligand.

The Cocatalyst

In an embodiment, the phosphinimine catalyst is used in combination with at least one activator (or "cocatalyst") to form an active polymerization catalyst system for olefin polymerization. Activators (i.e. cocatalysts) include ionic activator cocatalysts and hydrocarbyl aluminoxane cocatalysts.

The catalyst activator used to activate the transition metal polymerization catalyst can be any suitable activator including one or more activators selected from alkylaluminoxanes and ionic activators, optionally together with an alkylating agent.

Without wishing to be bound by theory, alkylaluminoxanes are thought to be complex aluminum compounds of the formula: $R^3{}_2Al^1O(R^3Al^1O)_mAl^1R^3{}_2$, wherein each $R^3$ is a $C_{1\text{-}20}$ hydrocarbyl radical and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the invention, $R^3$ of the alkylaluminoxane, is a methyl radical and m is from 10 to 40.

In an embodiment of the invention, the cocatalyst is methylaluminoxane (MAO).

In an embodiment of the invention, the cocatalyst is modified methylaluminoxane (MMAO).

The alkylaluminoxanes are used, for example, in substantial molar excess compared to the amount of group 4 transition metal in the organometallic compound/complex. The $Al^1$: group 4 transition metal molar ratios are from about 10:1 to about 10,000:1, or about 30:1 to about 500:1.

It is well known in the art, that the alkylaluminoxane can serve dual roles as both an alkylator and an activator. Hence, an alkylaluminoxane activator is often used in combination with activatable ligands such as halogens.

Alternatively, the catalyst activator of the present invention may be a combination of an alkylating agent (which may also serve as a scavenger) with an activator capable of ionizing the group 4 metal of the phosphinimine catalyst (i.e. an ionic activator). In this context, the activator can be chosen from one or more alkylaluminoxane and/or an ionic activator.

When present, the alkylating agent may be selected from $(R^4)_p\text{MgX}^2{}_{2\text{-}p}$ wherein $X^2$ is a halide and each $R^4$ is independently a $C_{1\text{-}10}$ alkyl radical and p is 1 or 2; $R^4\text{Li}$ wherein in $R^4$ is as defined above; $(R^4)_q\text{ZnX}^2{}_{2\text{-}q}$ wherein $R^4$ is as defined above, $X^2$ is halogen and q is 1 or 2; and $(R^4)_s\text{Al}^2X^2{}_{3\text{-}s}$ wherein $R^4$ is as defined above, $X^2$ is halogen and s is an integer from 1 to 3. In some embodiments, in the above compounds $R^4$ is a $C_{1\text{-}4}$ alkyl radical, and $X^2$ is chlorine. Commercially available compounds include triethyl aluminum (TEAL), diethyl aluminum chloride (DEAC), dibutyl magnesium ($(Bu)_2Mg$), and butyl ethyl magnesium (BuEtMg or BuMgEt). An alkylaluminoxane compound such as MAO, or MMAO may also be used as an alkylating agent.

The ionic activator may be selected from:
compounds of the formula $[R^5]^+[B(R^6)_4]^-$ wherein B is a boron atom, $R^5$ is a cyclic $C_{5\text{-}7}$ aromatic cation or a triphenyl methyl cation and each $R^6$ is independently selected from
phenyl radicals which are unsubstituted or substituted with from 3 to 5 substituents selected from a fluorine atom, a $C_{1-4}$ alkyl; and $C_{1-4}$ alkoxy radical wherein each alkyl or alkoxy is unsubstituted or substituted by a fluorine atom; and silyl radicals of the formula —Si—$(R^7)_3$ wherein each $R^7$ is independently selected from a hydrogen atom and a $C_{1-4}$ alkyl radical;

(ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from $C_{1-8}$ alkyl radicals; phenyl radicals which are unsubstituted or substituted by up to three $C_{1-4}$ alkyl radicals; and a group where one $R^8$ taken together with the nitrogen atom may form an anilinium radical and $R^6$ is as defined above; and (iii) compounds of the formula $B(R^6)_3$ wherein $R^6$ is as defined in (i) above.

In an embodiment $R^6$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

Examples of compounds capable of ionizing the transition metal catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra)phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium phenyltris-pentafluorophenyl borate, triphenylmethylium phenyl-trispentafluorophenyl borate, benzene(diazonium) phenyltrispentafluorophenyl borate, tropillium tetrakis(2,3,5,6-tetrafluorophenyl) borate, triphenylmethylium tetrakis(2,3,5,6-tetrafluorophenyl) borate, benzene(diazonium)tetrakis(3,4,5-trifluorophenyl) borate, tropillium tetrakis(3,4,5-trifluorophenyl) borate, benzene(diazonium)tetrakis(3,4,5-trifluorophenyl) borate, tropillium tetrakis(1,2,2-trifluoroethenyl) borate, trophenylmethylium tetrakis(1,2,2-trifluoroethenyl) borate, benzene(diazonium)tetrakis(1,2,2-trifluoroethenyl) borate, tropillium tetrakis(2,3,4,5-tetrafluorophenyl) borate, triphenylmethylium tetrakis(2,3,4,5-tetrafluorophenyl) borate, and benzene(diazonium)tetrakis(2,3,4,5-tetrafluorophenyl) borate.

Commercially available activators which are capable of ionizing the phosphinimine catalyst include:

N,N-dimethylaniliniumtetrakispentafluorophenyl borate ("$[Me_2NHPh][B(C_6F_5)_4]$"); triphenylmethylium tetrakispentafluorophenyl borate ("$[Ph_3C][B(C_6F_5)_4]$"); and trispentafluorophenyl boron.

In an embodiment of the invention, the ionic activator compounds may be used in amounts which provide a molar ratio of group 4 transition metal to boron that will be from about 1:1 to about 1:6.

Optionally, mixtures of alkylaluminoxanes and ionic activators can be used as activators for the phosphinimine catalyst.

The Inert Support

In some embodiments of the current invention, the polymerization catalyst will may comprise an inert support (note: the terms "support" and "inert support" are used interchangeable in the present invention). In one embodiment of the invention, the polymerization catalyst comprises a phosphinimine catalyst which is supported on an inert support.

The inert support used in the present invention can be any support known in the art to be suitable for use with polymerization catalysts. For example the support can be any porous or non-porous support material, such as talc, inorganic oxides, inorganic chlorides, aluminophosphates (i.e. $AlPO_4$) and polymer supports (e.g. polystyrene, etc.). Hence, supports include Group 2, 3, 4, 5, 13 and 14 metal oxides generally, such as silica, alumina, silica-alumina, magnesium oxide, magnesium chloride, zirconia, titania, clay (e.g. montmorillonite) and mixtures thereof.

Agglomerate supports such as agglomerates of silica and clay may also be used as a support in the current invention.

Supports are generally used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In an embodiment of the invention, the support is calcined at temperatures above about 200° C., or above about 300° C., or above about 400° C., or above about 500° C. In other embodiments, the support is calcined at from about 500° C. to about 1000° C., or from about 600° C. to about 900° C. The resulting support may be free of adsorbed water and may have a surface hydroxyl content from about 0.1 to about 5 mmol/g of support, or from about 0.5 to about 3 mmol/g. The amount of hydroxyl groups in a silica support may be determined according to the method disclosed by J. B. Peri and A. L. Hensley Jr., in *J. Phys. Chem.*, 72 (8), 1968, pg. 2926.

The support material, for example, an inorganic oxide, has a surface area of from about 10 to about 700 $m^2/g$, a pore volume in the range from about 0.1 to about 4.0 cc/g and an average particle size of from about 5 to about 500 μm. In another embodiment, the support material has a surface area of from about 50 to about 500 $m^2/g$, a pore volume in the range from about 0.5 to about 3.5 cc/g and an average particle size of from about 10 to about 200 μm. In another embodiment the support material has a surface area of from about 100 to about 400 $m^2/g$, a pore volume in the range from about 0.8 to about 3.0 cc/g and an average particle size of from about 5 to about 100 μm.

The support material, for example, an inorganic oxide, has an average pore size (i.e. pore diameter) of from about 10 to about 1000 Angstroms(Å). In another embodiment, the support material has an average pore size of from about 50 to about 500A. In another embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society*, 1938, v 60, pg. 309-319.

A silica support which is suitable for use in the present invention has a high surface area and is amorphous. By way of example only, useful silicas are commercially available under the trademark of Sylopol® 958, 955 and 2408 by the Davison Catalysts, a Division of W. R. Grace and Company and ES-70W by Ineos Silica.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,958,375.

An agglomerate of clay and inorganic oxide which is useful in the current invention may have the following properties: a surface area of from about 20 to about 800 $m^2/g$, or from about 50 to about 600 $m^2/g$; particles with a bulk density of from about 0.15 to about 1 g/ml, or from about 0.20 to about 0.75 g/ml; an average pore diameter of from about 30 to about 300 Angstroms (Å), or from about 60 to about 150 Å; a total pore volume of from about 0.10 to about 2.0 cc/g, or from about 0.5 to about 1.8 cc/g; and an average particle size of from about 4 to about 250 microns (µm), or from about 8 to about 100 microns.

Alternatively, a support, for example a silica support, may be treated with one or more salts of the type: $Zr(SO_4)_2 \cdot 4H_2O$, $ZrO(NO_3)_2$, and $Fe(NO_3)_3$ as taught in co-pending Canadian Patent Application No. 2,716,772. Supports that have been otherwise chemically treated are also contemplated for use with the catalysts and processes of the present invention.

The present invention is not limited to any particular procedure for supporting a phosphinimine catalyst or catalyst system components. Processes for depositing a phosphinimine catalyst as well as an activator on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright © 2001 by John Wiley & Sons, Inc.; for some non-limiting methods to support an phosphinimine catalyst see U.S. Pat. No. 5,965,677). For example, a phosphinimine catalyst may be added to a support by co-precipitation with the support material. The activator can be added to the support before and/or after the phosphinimine catalyst or together with the phosphinimine catalyst. Optionally, the activator can be added to a supported phosphinimine catalyst in situ or a phosphinimine catalyst may be added to the support in situ or a phosphinimine catalyst can be added to a supported activator in situ. A phosphinimine catalyst may be slurried or dissolved in a suitable diluent or solvent and then added to the support. Suitable solvents or diluents include but are not limited to hydrocarbons and mineral oil. A phosphinimine catalyst for example, may be added to the solid support, in the form or a solid, solution or slurry, followed by the addition of the activator in solid form or as a solution or slurry. Phosphinimine catalyst, activator, and support can be mixed together in the presence or absence of a solvent.

The Polymerization Process

Olefin polymerization processes which are compatible with the current invention include gas phase processes employing any type of known reactor which is compatible with the same. In one embodiment, ethylene copolymerization with an alpha-olefin is carried out in the gas phase, in for example a fluidized bed reactor. In another embodiment, ethylene copolymerization with an alpha-olefin is carried out in a single gas phase reactor.

Such reactors can operate at overall pressures of less than about 10,000 kPa, or less than about 6,000 kPa, or at less than about 3,000 kPa.

In an embodiment of the invention, the polymerization process is a continuous process carried out in a continuous reactor, which means that monomers and polymerization catalyst components are continually fed to the reactor while a polymer product, for example an ethylene copolymer, is continually produced and withdrawn from the reactor. A fluidized bed reactor, for example, is useful for continuous gas phase polymerization. Such a reactor is described in an article by A. E. Hamielec et. al. in Polymerization Reaction Engineering-Metallocene Catalysts, v 21 Prog. Polym. Sci. p. 651, 1996. Gas phase processes carried out in a fluidized bed reactor are also widely described in the patent literature (see for example U.S. Pat. Nos. 4,543,399; 4,588,790; 5,028,670; 5,317,036; 5,352,749; 5,405,922; 5,436,304; 5,453,471; 5,462,999; 5,616,661 and 5,668,228).

In general, a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Un-reacted monomer and other optional gaseous components exit the fluidized bed and are contacted with a cooling system to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

A fluidized bed gas phase reactor generally comprises a feed stream or a "cycle gas" stream which comprises ethylene and at least one comonomer, for example, 1-hexene, 1-butene, or 1-octene, with both of the ethylene and comonomer flowing continuously through the polymerization reactor. The amount of comonomer (relative to ethylene) is often conveniently expressed as the molar ratio of comonomer to the amount of ethylene fed to the reactor. It is usual for the ethylene and comonomer feed streams to contain further components such as condensable hydrocarbons which help with removal of heat from the reactor.

A fluidized bed reactor may include a reaction zone which is in fluid communication with a velocity reduction zone. The reaction zone includes a bed of growing polymer particles and catalyst composition particles, which are fluidized by the continuous flow of polymerizable and other gaseous components present in a make-up feed or recycle feed entering the reactor and passing through the reaction zone. The make-up feed includes polymerizable monomer (e.g. ethylene), comonomer (e.g. suitable alpha-olefin), and may also include a condensable hydrocarbon. Condensable hydrocarbons are well known in the art for use with fluidized bed polymerization as is described in for example U.S. Pat. Nos. 4,543,399, 5,405,922 and 5,462,999.

The fluidized bed resembles a mass of individually moving particles as created by the percolation of gas through the bed. To maintain a viable fluidized bed in the reaction zone, the gas velocity through the bed exceeds the minimum flow optimal for fluidization. The height to diameter ratio of a fluidized bed reaction zone varies between about 2:1 to about 5:1. The velocity reduction zone is designed to have a larger inner diameter than the reaction zone and may be conically tapered in shape. The velocity reduction zone slows the velocity of the gas due to the increased cross sectional area (relative to the reaction zone). Reduction of gas velocity drops entrained particles into the fluidized bed, which helps reduce the quantity of entrained particles flowing from the reactor. The gas exiting the overhead of the fluidized bed reactor is the recycle gas stream. The recycle stream is compressed in a compressor and then passed through a heat exchanger where heat is removed prior to return of the recycle gas to the polymerization zone. The cooled recycle stream absorbs the heat of reaction generated by the polymerization process. The recycle stream may be returned to the reactor and to the fluidized bed through a gas distributor plate. A gas deflector may also be installed at the gas inlet to reduce particle agglomeration as described in U.S. Pat. Nos. 4,933,149 and 6,627,713. The polymerization catalyst may be added to the fluidized bed reactor system at any point and by any suitable or well-known means. The polymerization catalyst is, in an embodiment of the invention, added directly to the fluidized bed reaction zone and above (i.e. after) the distributor plate. Monomer and comonomer may be introduced into the polymerization zone in any suitable manner, such as direct injection through a nozzle into the fluidized bed or into the cycle gas line.

In an embodiment of the invention, the reactor pressure in a gas phase process may vary from about atmospheric to about 600 psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. In embodiments of the invention, the reactor temperature can be from about 30° C. to about 130° C., including all numbers and narrower temperature ranges within this range, including for example about 65° C., about 70° C., about 75° C., about 80° C., about 85° C. and about 90° C. In further embodiments of the invention, the reactor temperature in a gas phase polymerization process can be from about 60° C. to about 120° C., or from about 70° C. to about 110° C., or from about 70° C. to about 100° C., or from about 70° C. to about 90° C., or from about 75° C. to about 85° C., or from about 75° C. to about 90° C.

The "polymerization reactor temperature" as used in the claims of the current invention may be the temperature measured at the fluidized bed level or anywhere within the fluidized bed in the reaction zone or the polymerization reactor where the temperature can be conveniently measured.

The fluidized bed process described above is well adapted for the preparation of polyethylene and polyethylene copolymers (also called "ethylene copolymers" herein). Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene to make an ethylene copolymer include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In one embodiment, the invention may be directed toward a polymerization process involving the polymerization of one or more of the monomer(s) and comonomer(s) including ethylene alone or in combination with one or more linear or branched comonomer(s) having from 3 to 30 carbon atoms, 3-12 carbon atoms, or 4 to 8 carbon atoms. The process may be used for copolymerization reactions involving polymerization of ethylene in combination with one or more of the comonomers, for example, the alpha-olefins: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. In one embodiment, the comonomer is an alpha-olefin having from 3 to 15 carbon atoms, 4 to 12 carbon atoms, or 4 to 10 carbon atoms.

In an embodiment of the present invention, ethylene is copolymerized with an alpha olefin having from 3-10 carbon atoms and ethylene makes up at least about 75 wt % of the total olefin feed entering the reactor.

In an embodiment of the present invention, ethylene is copolymerized with an alpha olefin having from 3-10 carbon atoms and ethylene makes up at least about 85 wt % of the total olefin feed entering the reactor.

In embodiments of the present invention, ethylene is copolymerized with propylene, 1-butene, 1-hexene or 1-octene.

In an embodiment of the present invention, ethylene is copolymerized with 1-butene and ethylene makes up at least about 75 weight % (i.e. wt %) of the total olefin feed entering the reactor.

In an embodiment of the present invention, ethylene is copolymerized with 1-hexene and ethylene makes up at least about 75 wt % of the total olefin feed entering the reactor.

In an embodiment of the present invention, ethylene is copolymerized with 1-hexene and ethylene makes up at least about 85 wt % of the total olefin feed entering the reactor.

Gas phase fluidized bed polymerization processes may employ a polymer seed bed in the reactor prior to initiating the polymerization process. It is contemplated by the current invention to use a polymer seed bed that has been treated with a catalyst modifier or an optional scavenger (see below). In addition, the polymer products obtained by using the catalysts and processes of the current invention may themselves be used as polymer seed bed materials.

A condensable hydrocarbon can be introduced into the reaction/recycle system at any point in the system, as described in U.S. Pat. No. 5,462,999.

To achieve higher cooling capacities, and hence higher reactor productivity it may be desirable to raise the dew point of the recycle stream to induce condensation and thus permit a larger increase in the heat to be removed from the fluidized bed. The dew point of the recycle stream can be increased by increasing the operating pressure of the reaction/recycle system and/or increasing the percentage of condensable hydrocarbon fluids and decreasing the percentage of non-condensable gases in the recycle stream in the manner disclosed by in U.S. Pat. Nos. 4,588,790 and 4,543,399.

For the purposes of this patent application, the term "condensable hydrocarbon" includes one or more saturated hydrocarbons which are inert with regard to the polymerization catalyst (that is, they are non-polymerizable) and which may be condensed to a liquid state at temperatures and pressures associated with the fluidized bed recycle stream or inlet streams entering a gas phase reactor. The condensable hydrocarbon may or may not be in gaseous form. In an embodiment condensable hydrocarbon is in gaseous form, under the temperature and pressure conditions within a gas phase reaction zone. Examples of suitable condensable hydrocarbons for use in the present invention are readily volatile liquid hydrocarbons, which may be selected from saturated hydrocarbons containing from 2 to 8 carbon atoms. Some non-limiting examples of saturated hydrocarbons which may be used in the present invention are ethane, propane, n-butane, isobutane, n-pentane, isopentane, neopentane, n-hexane, isohexane and other saturated $C_6$ hydrocarbons, n-heptane, n-octane and other saturated $C_7$ and $C_8$ hydrocarbons or mixtures thereof. In some embodiments, the inert condensable hydrocarbons are $C_4$ and $C_6$ saturated hydrocarbons.

In an embodiment of the invention, the condensable hydrocarbon is isopentane.

Catalyst Modifier

A "catalyst modifier" may be added directly or indirectly to the polymerization catalyst and is a compound which, when added to a polymerization catalyst or used in the presence of the same in appropriate amounts, can reduce, prevent or mitigate at least one: of fouling, sheeting, temperature excursions, and static level of a material in polymerization reactor; can alter catalyst kinetics; and/or can alter the properties of copolymer product obtained in a polymerization process.

Non limiting examples of catalyst modifiers which can be used in the present invention are Kemamine AS-990™, Kemamine AS650™, Armostat-1800™, bis-hydroxy-cocoamine, 2,2'-octadecyl-amino-bisethanol, and Atmer-163™.

Other catalyst modifiers may be used in the present invention and include compounds such as carboxylate metal salts (see U.S. Pat. Nos. 7,354,880; 6,300,436; 6,306,984; 6,391,819; 6,472,342 and 6,608,153 for examples), polysulfones, polymeric polyamines and sulfonic acids (see U.S. Pat. Nos. 6,562,924; 6,022,935 and 5,283,278 for examples). Polyoxyethylenealkylamines, which are described in for example in European Pat. Appl. No. 107,127, may also be used. Further catalyst modifiers include aluminum stearate and aluminum oleate. Catalyst modifiers are supplied commercially under the trademarks OCTASTAT™ and STADIS™. The catalyst modifier STADIS is described in U.S. Pat. Nos. 7,476,715; 6,562,924 and 5,026,795 and is available from Octel Starreon. STADIS generally comprises a polysulfone copolymer, a polymeric amine and an oil soluble sulfonic acid.

A long chain amine type catalyst modifier may be added to a reactor zone (or associated process equipment) separately from the polymerization catalyst system, as part of the polymerization catalyst system, or both as described in co-pending CA Pat. Appl. No. 2,742,461. The long chain amine can be a long chain substituted monoalkanolamine, or a long chain substituted dialkanolamine as described in co-pending CA Pat. Appl. No. 2,742,461, which is incorporated herein in full.

In an embodiment of the invention, the polymerization catalyst additionally comprises a catalyst modifier comprising at least one compound represented by the formula: R*N((CH$_2$)$_n$OH)((CH$_2$)$_m$OH) where R* is a hydrocarbyl group having anywhere from 5 to 30 carbon atoms, and n and m are integers from 1 to 20.

Optional Scavenger

Optionally, scavengers are added to the polymerization process. The present invention can be carried out in the presence of any suitable scavenger or scavengers. Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide and aryloxide, either of which may have from 1 to about 20 carbon atoms; halide; and hydride; and n is a number from 1 to 3, inclusive; or hydrocarbyl aluminoxanes having the formula: $R^3{}_2Al^1O(R^3Al^1O)_mAl^1R^3{}_2$ wherein each $R^3$ is independently a $C_{1-20}$ hydrocarbyl radical and m is from 3 to 50. Some non-limiting examples of scavengers include triisobutylaluminum, triethylaluminum, trimethylaluminum or other trihydrocarbyl aluminum compounds.

The scavenger may be used in any suitable amount but by way of non-limiting examples only, can be present in an amount to provide a molar ratio of Al:M (where M is the metal of the organometallic compound) of from about 20 to about 2000, or from about 50 to about 1000, or from about 100 to about 500. Generally the scavenger is added to the reactor prior to the polymerization catalyst and in the absence of additional poisons and over time declines to 0, or is added continuously.

Optionally, the scavengers may be independently supported. For example, an inorganic oxide that has been treated with an organoaluminum compound or hydrocarbyl aluminoxane may be added to the polymerization reactor. The method of addition of the organoaluminum or hydrocarbyl aluminoxane compounds to the support is not defined and is carried out by procedures well known in the art.

A scavenger may optionally be added to the catalyst modifier prior to feeding the catalyst modifier to a reactor or prior to combining the catalyst modifier with the polymerization catalyst (or one or more polymerization catalyst components). Alternatively a scavenger may be combined with the catalyst modifier on route to a polymerization reactor.

Polymer

In one embodiment, the polymer compositions made using the present invention may be copolymers of ethylene and an alpha olefin selected from 1-butene, 1-hexene and 1-octene.

In embodiments of the invention, the copolymer composition will comprise at least about 75 weight % of ethylene units, or at least about 80 wt % of ethylene units, or at least about 85 wt % of ethylene units with the balance being an alpha-olefin unit, based on the weight of the copolymer composition.

Polymer properties such as average molecular weight (e.g. Mw, Mn and Mz), molecular weight distribution (i.e. Mw/Mn), density, melt indices (e.g. $I_2$, $I_5$, $I_6$ $I_{21}$, $I_{10}$), melt index ratios or melt flow ratios (e.g. $I_{21}/I_2$, $I_{21}/I_5$), stress exponent, or composition distribution breadth index CDBI (50), TREF-profile, comonomer distribution profile, and the like are defined further below and in for example co-pending CA Application No. 2,734,167.

Molecular Weight Distribution, Stress Exponent and Melt Flow Ratio

Indices which are known to correlate with ethylene copolymer processing ease include the following:

the molecular weight distribution, which is the weight average molecular weight Mw, divided by the number average molecular weight Mn (i.e. Mw/Mn);

the stress exponent which is defined as $Log_{10}[I_6/I_2]/Log_{10}[6.48/2.16]$; and the melt flow ratio which is defined as the high load melt index $I_{21}$, divided by the melt index $I_2$ (i.e. $I_{21}/I_2$).

In the present invention, the molecular weight distribution ($M_w/M_n$) of an ethylene copolymer made with the polymerization catalyst defined above is altered by changing the temperature of the polymerization reaction.

In an embodiment of the invention, altering the polymerization reactor temperature by at least about 1° C., or at least about 5° C., or at least about 10° C., changes the molecular weight distribution ($M_w/M_n$) of an ethylene copolymer made with the polymerization catalyst defined above.

In embodiments of the invention, altering the polymerization reactor temperature changes the molecular weight distribution ($M_w/M_n$) of an ethylene copolymer made with the polymerization catalyst defined above by at least about 1%, or at least about 3%, or at least about 5%, or at least about 10%, or at least about 15%, or at least about 20%, or at least about 25%. In embodiments of the invention, altering the polymerization reactor temperature by at least about 5° C. changes the molecular weight distribution ($M_w/M_n$) of an ethylene copolymer made with the polymerization catalyst defined above by at least about 1%, or at least about 3%, or at least about 5%, or at least about 10%, or at least about 15%, or at least about 20%. In embodiments of the invention, altering the polymerization reactor temperature by at least about 10° C. changes the molecular weight distribution ($M_w/M_n$) of an ethylene copolymer made with the polymerization catalyst defined above by at least about 1%, or at least about 3%, or at least about 5%, or at least about 10%, or at least about 15%, or at least about 20%, or at least about 25%.

In an embodiment of the invention, increasing the polymerization reactor temperature decreases the molecular weight distribution ($M_w/M_n$) of an ethylene copolymer made with the polymerization catalyst defined above.

In an embodiment of the invention, increasing the polymerization reactor temperature by at least about 1° C., or at least about 5° C., or at least about 10° C., decreases the molecular weight distribution ($M_w/M_n$) of an ethylene copolymer made with the polymerization catalyst defined above.

In an embodiment of the invention, decreasing the polymerization reactor temperature increases the molecular weight distribution ($M_w/M_n$) of an ethylene copolymer made with the polymerization catalyst defined above.

In an embodiment of the invention, decreasing the polymerization reactor temperature by at least about 1° C., or at least about 5° C., or at least about 10° C., increases the molecular weight distribution ($M_w/M_n$) of an ethylene copolymer made with the polymerization catalyst defined above.

In embodiments of the invention, increasing the polymerization reactor temperature, decreases the molecular weight distribution ($M_w/M_n$) of an ethylene copolymer made with the polymerization catalyst defined above by at least about 1%, or at least about 3%, or at least about 5%, or at least about 10%, or at least about 15%, or at least about 20%, or at least about 25%. In embodiments of the invention, increasing the polymerization reactor temperature by at least about 5° C., decreases the molecular weight distribution ($M_w/M_n$) of an ethylene copolymer made with the polymerization catalyst defined above by at least about 1%, or at least about 3%, or at least about 5%, or at least about 10%, or at least about 15%, or at least about 20%. In embodiments of the invention, increasing the polymerization reactor temperature by at least about 10° C., decreases the molecular weight distribution ($M_w/M_n$) of an ethylene copolymer made with the polymerization catalyst defined above by at least about 1%, or at least about 3%, or at least about 5%, or at least about 10%, or at least about 15%, or at least about 20%, or at least about 25%.

In embodiments of the invention, decreasing the polymerization reactor temperature increases the molecular weight distribution ($M_w/M_n$) of an ethylene copolymer made with the polymerization catalyst defined above by at least about 1%, or at least about 3%, or at least about 5%, or at least about 10%, or at least about 15%, or at least about 20%, or at least about 25%. In embodiments of the invention, decreasing the polymerization reactor temperature by at least about 5° C., increases the molecular weight distribution ($M_w/M_n$) of an ethylene copolymer made with the polymerization catalyst defined above by at least about 1%, or at least about 3%, or at least about 5%, or at least about 10%, or at least about 15%, or at least about 20%. In embodiments of the invention, decreasing the polymerization reactor temperature by at least about 10° C., increases the molecular weight distribution ($M_w/M_n$) of an ethylene copolymer made with the polymerization catalyst defined above by at least about 1%, or at least about 3%, or at least about 5%, or at least about 10%, or at least about 15%, or at least about 20%, or at least about 25%.

In the present invention, the stress exponent of an ethylene copolymer made with the polymerization catalyst defined above is altered by changing the temperature of the polymerization reaction.

In an embodiment of the invention, altering the polymerization reactor temperature by at least about 1° C., or at least about 5° C., or at least about 10° C., changes the stress exponent of an ethylene copolymer made with the polymerization catalyst defined above.

In embodiments of the invention, altering the polymerization reactor temperature changes the stress exponent of an ethylene copolymer made with the polymerization catalyst defined above by at least about 1%, or at least about 3%, or at least about 5%, or at least about 10%. In embodiments of the invention, altering the polymerization reactor temperature by at least about 5° C. changes the stress exponent of an ethylene copolymer made with the polymerization catalyst defined above by at least about 1%, or at least about 3%, or by at least about 5%, or at least about 10%. In embodiments of the invention, altering the polymerization reactor temperature by at least about 10° C. changes the stress exponent of an ethylene copolymer made with the polymerization catalyst defined above by at least about 1%, or at least about 3%, or at least about 5%, or at least about 10%, or at least about 15%.

In an embodiment of the invention, increasing the polymerization reactor temperature decreases the stress exponent of an ethylene copolymer made with the polymerization catalyst defined above.

In an embodiment of the invention, increasing the polymerization reactor temperature by at least about 1° C., or at least about 5° C., or at least about 10° C., decreases the stress exponent of an ethylene copolymer made with the polymerization catalyst defined above.

In an embodiment of the invention, decreasing the polymerization reactor temperature increases the stress exponent of an ethylene copolymer made with the polymerization catalyst defined above.

In an embodiment of the invention, decreasing the polymerization reactor temperature by at least about 1° C., or at least about 5° C., or at least about 10° C., increases the stress exponent of an ethylene copolymer made with the polymerization catalyst defined above.

In embodiments of the invention, increasing the polymerization reactor temperature, decreases the stress exponent of an ethylene copolymer made with the polymerization catalyst defined above by at least about 1%, or at least about 3%, or at least about 5%, or at least about 10%. In embodiments of the invention, increasing the polymerization reactor temperature by at least about 5° C., decreases the stress exponent of an ethylene copolymer made with the polymerization catalyst defined above by at least about 1%, or at least about 3%, or at least about 5%, or at least about 10%. In embodiments of the invention, increasing the polymerization reactor temperature by at least about 10° C., decreases the stress exponent of an ethylene copolymer made with the polymerization catalyst defined above by at least about 1%, or at least about 3%, or at least about 5%, or at least about 10%, or at least about 15%.

In embodiments of the invention, decreasing the polymerization reactor temperature, increases the stress exponent of an ethylene copolymer made with the polymerization catalyst defined above by at least about 1%, or at least about 3%, or at least about 5%, or at least about 10%. In embodiments of the invention, decreasing the polymerization reactor temperature by at least about 5° C., increases the stress exponent of an ethylene copolymer made with the polymerization catalyst defined above by at least about 1%, or at least about 3%, or at least about 5%, or at least about 10%. In embodiments of the invention, decreasing the polymerization reactor temperature by at least about 10° C., increases the stress exponent of an ethylene copolymer made with the polymerization catalyst defined above by at least about 1%, or at least about 3%, or at least about 5%, or at least about 10%, or at least about 15%.

In the present invention, the melt flow ratio of an ethylene copolymer made with the polymerization catalyst defined above is altered by changing the temperature of the polymerization reaction.

In an embodiment of the invention, altering the polymerization reactor temperature by at least about 1° C., or at least about 5° C., or at least about 10° C., changes the melt flow ratio of an ethylene copolymer made with the polymerization catalyst defined above.

In embodiments of the invention, altering the polymerization reactor temperature changes the melt flow ratio of an ethylene copolymer made with the polymerization catalyst defined above by at least about 3%, or at least about 5%, or at least about 10%, or at least about 15%, or at least about 20%. In embodiments of the invention, altering the polymerization reactor temperature by at least about 5° C. changes the melt flow ratio of an ethylene copolymer made with the polymerization catalyst defined above by at least about 3%, or at least about 5%, or at least about 10%, or at least about 15%. In embodiments of the invention, altering the polymerization reactor temperature by at least about 10° C. changes the melt flow ratio of an ethylene copolymer made with the polymerization catalyst defined above by at least about 3%, or at least about 5%, or at least about 10%, or at least about 15%, or at least about 20%, or at least about 25%.

In an embodiment of the invention, increasing the polymerization reactor temperature decreases the melt flow ratio of an ethylene copolymer made with the polymerization catalyst defined above.

In an embodiment of the invention, increasing the polymerization reactor temperature by at least about 1° C., or at least about 5° C., or at least about 10° C., decreases the melt flow ratio of an ethylene copolymer made with the polymerization catalyst defined above.

In an embodiment of the invention, decreasing the polymerization reactor temperature increases the melt flow ratio of an ethylene copolymer made with the polymerization catalyst defined above.

In an embodiment of the invention, decreasing the polymerization reactor temperature by at least about 1° C., or at least about 5° C., or at least about 10° C., increases the melt flow ratio of an ethylene copolymer made with the polymerization catalyst defined above.

In embodiments of the invention, increasing the polymerization reactor temperature, decreases the melt flow ratio of an ethylene copolymer made with the polymerization catalyst defined by at least about 3%, or at least about 5%, or at least about 10%, or at least about 15%, or at least about 20%. In embodiments of the invention, increasing the polymerization reactor temperature by at least about 5° C., decreases the melt flow ratio of an ethylene copolymer made with the polymerization catalyst defined above by at least about 3%, or at least about 5%, or at least about 10%, or at least about 15%. In embodiments of the invention, increasing the polymerization reactor temperature by at least about 10° C., decreases the melt flow ratio of an ethylene copolymer made with the polymerization catalyst defined by at least about 3%, or at least about 5%, or at least about 10%, or at least about 15%, or at least about 20%, or at least about 25%.

In embodiments of the invention, decreasing the polymerization reactor temperature, increases the melt flow ratio of an ethylene copolymer made with the polymerization catalyst defined by at least about 3%, or at least about 5%, or at least about 10%, or at least about 15%, or at least about 20%. In embodiments of the invention, decreasing the polymerization reactor temperature by at least about 5° C., increases the melt flow ratio of an ethylene copolymer made with the polymerization catalyst defined above by at least about 3%, or at least about 5%, or at least about 10%, or at least about 15%. In embodiments of the invention, decreasing the polymerization reactor temperature by at least about 10° C., increases the melt flow ratio of an ethylene copolymer made with the polymerization catalyst defined by at least about 3%, or at least about 5%, or at least about 10%, or at least about 15%, or at least about 20%, or at least about 25%.

The present invention will further be described by reference to the following examples. The following examples are merely illustrative of the invention and are not intended to be limiting. Unless otherwise indicated, all percentages are by weight unless otherwise specified.

EXAMPLES

All reactions involving air and or moisture sensitive compounds were conducted under nitrogen using standard Schlenk and cannula techniques, or in a glovebox. Reaction solvents were purified either using the system described by Pangborn et. al. in *Organometallics* 1996, v15, p.1518 or used directly after being stored over activated 4 Å molecular sieves. The methylaluminoxane used was a 10% MAO solution in toluene supplied by Albemarle which was used as received. The support used was silica Sylopol 2408 obtained from W.R. Grace. & Co. The support was calcined by fluidizing with air at 200° C. for 2 hours followed by nitrogen at 600° C. for 6 hours and stored under nitrogen.

Melt index, $I_2$, in g/10 min was determined on a Tinius Olsen Plastomer (Model MP993) in accordance with ASTM D1238 condition F at 190° C. with a 2.16 kilogram weight. Melt index $I_6$ in accordance with ASTM D1238 condition F at 190° C. with a 6.48 kilogram weight was determined with a Melt index, $I_{10}$, was determined in accordance with ASTM D1238 condition F at 190° C. with a 10 kilogram weight. High load melt index, $I_{21}$, in g/10 min was determined in accordance with ASTM D1238 condition E at 190° C. with a 21.6 kilogram weight. Melt flow ratio (also sometimes called melt index ratio) is $I_{21}/I_2$. The stress exponent (S.Ex.) is defined as $Log_{10}[I_6/I_2]/Log_{10}[6.48/2.16]$.

Polymer density was determined in grams per cubic centimeter (g/cc) according to ASTM D1928. $M_n$, $M_w$, and $M_z$ (g/mol) were determined by high temperature Gel Permeation Chromatography with differential refractive index detection using universal calibration (e.g. ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). The molecular weight distribution (MWD) is the weight average molecular weight divided by the number average molecular weight, $M_w/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e. the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration. A plot of the comonomer distribution vs log MW (i.e. the amount of SCB per 1000 carbons, plotted against absolute molecular weight) for an ethylene polymer shows the trend and provides the slope of comonomer distribution.

In the present invention, the slope of the comonomer distribution in a GPC-FTIR chromatograph is determined by considering only the part of the SCB/1000 carbons curve which occurs at an absolute molecular weight (MW) of 50,000 g/mole. A least squares best fit analysis was applied to get the best fit of a line (y=mx+c) to this portion of the comonomer distribution curve, where m is the slope of the fitted line, y is the comonomer incorporation per 1000 carbon atoms, and x is log (molecular weight).

To determine the composition distribution breadth index CDBI, which is also designated CDBI(50) in the present invention, a solubility distribution curve is first generated for the copolymer. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI(50) is determined by establishing the weight percentage of a copolymer sample that has a comonomer content within 50% of the median comonomer content on each side of the median (see WO 93/03093 for the definition of CDBI(50)). The weight percentage of copolymer eluting at from 90-105° C., is determined by calculating the area under the TREF curve at an elution temperature of from 90 to 105° C. The weight percent of copolymer eluting below at or 40° C. and above 100° C. was determined similarly. For the purpose of simplifying the correlation of composition with elution temperature, all fractions are assumed to have a Mn≥15,000, where Mn is the number average molecular weight of the fraction. Any low weight fractions present generally represent a trivial portion of the polymer. The remainder of this description and the appended claims maintain this convention of assuming all fractions have Mn≥15,000 in the CDBI measurement.

The temperature rising elution fractionation (TREF) method used herein was as follows. Homogeneous polymer samples (pelletized, 50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. about 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The TREF procedures described above are well known to persons skilled in the art and can be used to determine the modality of a TREF profile, a CDBI(50), a copolymer wt % eluting at or below 40° C., a copolymer wt % eluting at above 100° C., a copolymer wt % eluting at from 90° C. to 105° C., as well as the temperatures or temperature ranges where elution intensity maxima (elution peaks) occur.

The melting points including a peak melting point ($T_m$) and the percent crystallinity of the copolymers are determined by using a TA Instrument DSC Q1000 Thermal Analyzer at 10° C./min. In a DSC measurement, a heating-cooling-heating cycle from room temperature to 200° C. or vice versa is applied to the polymers to minimize the thermo-mechanical history associated with them. The melting point and percent of crystallinity are determined by the primary peak temperature and the total area under the DSC curve respectively from the second heating data. The peak melting temperature $T_m$ is the higher temperature peak, when two peaks are present in a bimodal DSC profile (typically also having the greatest peak height).

Dynamic Mechanical Analysis (DMA). Rheological measurements are carried out on a dynamic rheometer with 25 mm diameter parallel plates in a frequency sweep mode under full nitrogen blanketing. The polymer samples are appropriately stabilized with the anti-oxidant additives and then inserted into the test fixture for at least one minute preheating to ensure the normal force decreasing back to zero. All DMA experiments are conducted at 10% strain, 0.05 to 100 rad/s and 190° C. Orchestrator Software is used to determine the viscoelastic parameters including the storage modulus (G'), loss modulus (G"), phase angle (δ), complex modulus (G*) and complex viscosity ($\eta_1^*$). The melt elastic modulus G' (G"=500 Pa) is obtained by determining the G' value at a reference G" value of 500 Pa.

Preparation of Catalyst

Synthesis of (1-$C_6F_5CH_2$-Indenyl)((t-Bu)$_3$P=N)TiCl$_2$: To distilled indene (15.0 g, 129 mmol) in heptane (200 mL) was added BuLi (82 mL, 131 mmol, 1.6 M in hexanes) at room temperature. The resulting reaction mixture was stirred overnight. The mixture was filtered and the filter cake washed with heptane (3×30 mL) to give indenyllithium (15.62 g, 99% yield). Indenyllithium (6.387 g, 52.4 mmol) was added as a solid over 5 minutes to a stirred solution of $C_6F_5CH_2$—Br (13.65 g, 52.3 mmol) in toluene (100 mL) at room temperature. The reaction mixture was heated to 50° C. and stirred for 4 h. The product mixture was filtered and washed with toluene (3×20 mL). The combined filtrates were evaporated to dryness to afford 1-$C_6F_5CH_2$-indene (13.58 g, 88%). To a stirred slurry of TiCl$_4$·0.2THF (1.72 g, 5.15 mmol) in toluene (15 mL) was added solid (t-Bu)$_3$P=N—Li (1.12 g, 5 mmol) at room temperature. The resulting reaction mixture was heated at 100° C. for 30 min and then allowed to cool to room temperature. This mixture containing ((t-Bu)$_3$P=N)TiCl$_3$ (1.85 g, 5 mmol) was used in the next reaction. To a THF solution (10 mL) of 1-$C_6F_5CH_2$-indene (1.48 g, 5 mmol) cooled at −78° C. was added n-butyllithium (3.28 mL, 5 mmol, 1.6 M in hexanes) over 10 minutes. The resulting dark orange solution was stirred for 20 minutes and then transferred via a double-ended needle to a toluene slurry of ((t-Bu)$_3$P=N)TiCl$_3$ (1.85 g, 5 mmol). The cooling was removed from the reaction mixture which was stirred for a further 30 minutes. The solvents were evaporated to afford a yellow pasty residue. The solid was re-dissolved in toluene (70 mL) at 80° C. and filtered hot. The toluene was evaporated to afford pure (1-$C_6F_5CH_2$—Indenyl)((t-Bu)$_3$P=N)TiCl$_2$ (2.35 g, 74%).

Sylopol 2408 silica purchased from Grace Davison was calcined by fluidizing with air at 200° C. for 2 hours and subsequently with nitrogen at 600° C. for 6 hours. 114.273 grams of the calcined silica was added to 620 mL of toluene. 312.993 g of a MAO solution containing 4.5 weight % Al purchased from Albemarle was added to the silica slurry quantitatively. The mixture was stirred for 2 hours at ambient temperature. The stirring rate should be such so as not to break-up the silica particles. 2.742 grams of (1-$C_6F_5CH_2$—Indenyl)((t-Bu)$_3$P=N)TiCl$_2$ (prepared as above in Example 1) was weighed into a 500-mL Pyrex bottle and 300 mL of toluene added. The metal complex solution was added to the silica slurry quantitatively. The resulting slurry was stirred for 2 hours at ambient temperature. 21.958 g of 18.55 wt % toluene solution of Armostat® 1800 was weighed into a small vessel and transferred quantitatively to the silica slurry. The resulting mixture was stirred for a further 30 minutes after which the slurry was filtered, yielding a clear filtrate. The solid component was washed with toluene (2×150 mL) and then with pentane (2×150 mL). The final product was dried in vacuo to between 450 and 200 mtorr and stored under nitrogen until used. The finished catalyst had a pale yellow to pale orange colour. The catalyst had 2.7 wt % of Armostat present.

Polymerization: Continuous ethylene/1-hexene gas phase copolymerization experiments were conducted in a 56.4 L Technical Scale Reactor (TSR) in continuous gas phase operation. (for an example of a TSR reactor set up see Eur. Pat. Appl. No. 659,773A1). Ethylene polymerizations were run at 75° C.-90° C. with a total operating pressure of 300 pounds per square inch gauge (psig). Gas phase compositions for ethylene (C2) and 1-hexene (C6) were controlled via closed-loop Proportional-Integral-Derivative controllers to control to values of 65.0 and 0.9-1.7 mole %, respectively. Hydrogen (H2) was metered into the reactor in a molar feed ratio of 0.0008-0.00144 relative to ethylene feed during polymerization. Nitrogen constituted the remainder of the gas phase mixture (approximately 34 mole % or less, depending on whether isopentane is present). The amount of condensable hydrocarbon, isopentane (i-C5), was adjusted as shown in Table 1, and is represented as the mol % (i.e. mole percent) of isopentane against the total moles of polymerizable and non-polymerizable components present in the reactor as measured using a gas chromatography (i.e. the total moles of condensable hydrocarbon to the total moles of monomer, comonomer, hydrogen, nitrogen and condensable hydrocarbon present in the reactor taken as a percentage). Typical production rate for these conditions is 2.0 to 3.0 kg of polyethylene per hour. A seed-bed was used and prior to polymerization start-up was washed with a small amount of triethylaluminum, TEAL to scavenge impurities. Prior to introduction of the catalyst TEAL was flushed from the reactor. The catalyst was fed to the reactor together with small amount of dilute TEAL solution (0.25 wt %) during the start-up phase. The addition of TEAL was discontinued once the desired polymer production rate was reached. Alternatively, the reactor can be started with the catalyst feed line alone during the polymerization start-up phase (that is, without initially feeding the TEAL solution). The polymerization reaction was initiated under conditions of low comonomer concentration, followed by gradual adjustment of the comonomer to ethylene ratio to provide the targeted polymer density. Relevant polymerization data are provided in Table 1 (C6/C2 is mol/mol feed ratio to the reactor; H2/C2 is the mol/mol feed ratio to the reactor). Polymer data for the resulting resins are provided in Table 2. The polymerization reaction temperature within the reactor (i.e. the reactor temperature) was measured using a thermocouple extending about 2 inches into the reaction zone of the TSR reactor. The thermocouple was located on the reactor wall on the top section of the TSR reactor.

TABLE 1

Polymerization Conditions

| Poly. Run No. | Reactor Temp (° C.) | C6/C2 (mol/mol) | H2/C2 (mol/mol) | i-C5 mol % |
|---|---|---|---|---|
| 1 | 75 | 0.014 | 0.00080 | 0.0 |
| 2 | 85 | 0.014 | 0.00080 | 0.0 |
| 3 | 75 | 0.014 | 0.00140 | 0.0 |
| 4 | 85 | 0.014 | 0.00140 | 0.0 |
| 5 | 75 | 0.025 | 0.00140 | 0.0 |
| 6 | 85 | 0.025 | 0.00140 | 0.0 |
| 7 | 80 | 0.023 | 0.00123 | 11.9 |
| 8 | 90 | 0.022 | 0.00144 | 13.2 |

TABLE 2

Polymer Properties

| | Poly. Run. No. | | | | | | | |
|---|---|---|---|---|---|---|---|---|
| | 1 | 2 | 3 | 4 | 5 | 6 | 7 | 8 |
| Reactor Temp. (° C.) | 75 | 85 | 75 | 85 | 75 | 85 | 80 | 90 |
| Density (g/cm$^3$) | 0.9272 | 0.9262 | 0.9317 | 0.9306 | 0.9214 | 0.9217 | 0.9203 | 0.9229 |
| melt index, $I_2$ | 0.27 | 0.44 | 1.93 | 2.23 | 1.14 | 2.18 | 0.38 | 2.98 |
| Melt flow ratio $I_{21}/I_2$ | 43.6 | 35.3 | 35.8 | 29.8 | 41 | 28.8 | 38.2 | 21.8 |
| Stress Exponent | 1.54 | 1.47 | 1.44 | 1.36 | 1.48 | 1.35 | 1.46 | 1.23 |
| Mw/Mn | 4.79 | 4.19 | 4.65 | 4.56 | 5.22 | 4.35 | 4.4 | 3.13 |
| CDBI (50) wt % | 38.4 | 47.5 | 40.9 | 49.5 | 37.8 | 52.2 | 66.9 | 63.8 |
| wt % at 90-105° C. by TREF | 40.3 | 31.7 | 35.9 | 30.8 | 20.1 | 14.8 | 13.9 | 9.5 |
| G' (G" = 500 Pa) by DMA (Pa) | 265 | 242 | 153 | 147 | 174 | 133 | 206 | 71 |
| Slope of C6 placement by FTIR | 13.65 | 7.68 | 11.89 | 7.28 | 16.93 | 9.12 | 9.79 | 3.57 |

As can be seen from the data in Tables 1 and 2, a rise in reactor temperature causes a decrease in the ethylene copolymer molecular weight distribution (Mw/Mn), stress exponent and MFR ($I_{21}/I_2$). Conversely, a decrease in reactor temperature causes an increase in the ethylene copolymer molecular weight distribution (Mw/Mn), stress exponent and MFR ($I_{21}/I_2$). In some cases, the molecular weight distribution changes by more than 10% (compare polymer run nos. 1 and 2), or more than 15% (compare polymer run nos. 5 and 6), or more than 25% (compare polymer run nos. 7 and 8). In some cases, the stress exponent changes by more than 3% (compare polymer run nos. 1 and 2, or 3 and 4), or about 10% (compare polymer run nos. 5 and 6), or more than 15% (compare polymer run nos. 7 and 8). In some cases, the MFR changes by more than 15% (compare polymer run nos. 1 and 2 or 3 and 4), or more than 25% (compare polymer run nos. 5 and 6), or even more than 40% (compare polymer run nos. 7 and 8).

From the data provided above, a person skilled in the art would recognize that, use of phosphinimine catalyst having an indenyl ligand as defined herein, in a gas phase reactor, would allow one to control polyethylene resin properties, such as molecular weight distribution, stress exponent and melt flow ratio, simply by changing the polymerization reactor temperature. Such a method allows one to make different ethylene copolymer products without dramatically changing reactor operating conditions and without requiring reactor shut down (to change polymerization catalysts, for example).

As can also be seen from the data provided in Tables 1 and 2, several other ethylene copolymer parameters are affected by a change in temperature and include parameters which characterize the "composition distribution" as defined in U.S. Pat. Appl. Pub. No. 2012/0316301. For example, the composition distribution breadth index CDBI(50), the amount of polymer eluted at between 90° and 105° C. in a TREF fractogram, the slope of comonomer incorporation vs molecular weight as determined in a GPC-FTIR profile, the melt index $I_2$ and the melt elastic modulus (G' at G"=500Pa) as determined by dynamic mechanical analysis (DMA), all change with a change in reactor temperature.

The CDBI(50), increases with a reactor temperature increase and decreases with a reactor temperature decrease.

The slope of the comonomer incorporation against molecular weight, decreases with an increase in reactor temperature and increases with a decrease in reactor temperature.

The amount of polymer eluted at between 90 and 105° C. in a TREF fractogram decreases with an increase in reactor temperature and increases with a decrease in reactor temperature.

Finally, the melt elastic modulus (G' at G"=500Pa) decreases with an increase in reactor temperature and increases with a decrease in reactor temperature.

The present invention has been described with reference to certain details of various embodiments thereof. It is not intended that such details be regarded as limitations upon the scope of the invention except insofar as and to the extent that they are included in the accompanying claims.

What is claimed is:

1. A method for altering the stress exponent of an ethylene copolymer, the method comprising polymerizing ethylene and an alpha-olefin in a gas phase reactor with a polymerization catalyst, the polymerization catalyst comprising a phosphinimine catalyst as the only polymerization active catalyst, an inert support, and a cocatalyst; wherein the stress exponent of the ethylene copolymer is altered by changing the temperature in the reactor by at least 1° C.; and wherein the phosphinimine catalyst has the formula: LTi(N=P(t-Bu)$_3$)X$_2$;

where L is a substituted or unsubstituted indenyl ligand and X is an activatable ligand.

2. The method of claim 1, wherein the temperature is increased by an amount which is sufficient to reduce the stress exponent by at least 3%.

3. The method of claim 1, wherein the temperature is decreased by an amount which is sufficient to increase the stress exponent by at least 3%.

4. The method of claim 1, wherein the cocatalyst is an alkylaluminoxane compound.

5. The method of claim 1, wherein the inert support is silica.

6. The method of claim 1, wherein the alpha-olefin is 1-hexene.

7. The method of claim 1, wherein the phosphinimine catalyst is (1-C$_6$F$_5$CH$_2$-Ind)Ti(N=P(t-Bu)$_3$)Cl$_2$.

8. The method of claim 1, wherein the gas phase reactor is a fluidized bed reactor.

9. The method of claim 1, wherein the temperature is changed by at least 5° C.

10. The method of claim 1, wherein the polymerization catalyst additionally comprises a catalyst modifier.

11. A method for altering the stress exponent of an ethylene copolymer, the method comprising polymerizing ethylene and an alpha-olefin in a gas phase reactor with a polymerization catalyst, the polymerization catalyst comprising a phosphinimine catalyst, an inert support, and a cocatalyst; wherein the stress exponent of the ethylene copolymer is altered by changing the temperature in the reactor by at least 1° C.; and wherein the phosphinimine catalyst has the formula: $(1-C_6F_5CH_2\text{-Ind})Ti(N{=}P(t\text{-}Bu)_3)X_2$;

where X is an activatable ligand.

12. The method of claim 11, wherein the temperature is increased by an amount which is sufficient to reduce the stress exponent by at least 3%.

13. The method of claim 11, wherein the temperature is decreased by an amount which is sufficient to increase the stress exponent by at least 3%.

14. The method of claim 11, wherein the cocatalyst is an alkylaluminoxane compound.

15. The method of claim 11, wherein the inert support is silica.

16. The method of claim 11, wherein the alpha-olefin is 1-hexene.

17. The method of claim 11, wherein the gas phase reactor is a fluidized bed reactor.

18. The method of claim 11, wherein the temperature is changed by at least 5° C.

19. The method of claim 11, wherein the polymerization catalyst additionally comprises a catalyst modifier.

* * * * *